United States Patent
Shigeoka

(10) Patent No.: US 11,076,064 B2
(45) Date of Patent: Jul. 27, 2021

(54) IMAGE FORMING APPARATUS TO IMPROVE THE SPEED OF THE COPYING PROCESS

(71) Applicant: KYOCERA Document Solutions Inc., Osaka (JP)

(72) Inventor: Tatsuya Shigeoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/033,381

(22) Filed: Sep. 25, 2020

(65) Prior Publication Data

US 2021/0099596 A1 Apr. 1, 2021

(30) Foreign Application Priority Data

Sep. 27, 2019 (JP) .............................. JP2019-176498

(51) Int. Cl.
G06F 3/12 (2006.01)
H04N 1/00 (2006.01)
H04N 1/387 (2006.01)

(52) U.S. Cl.
CPC ..... *H04N 1/00649* (2013.01); *H04N 1/00602* (2013.01); *H04N 1/387* (2013.01)

(58) Field of Classification Search
CPC . H04N 1/00649; H04N 1/00602; H04N 1/387
USPC ........................................................ 358/1.12
See application file for complete search history.

(56) References Cited

U.S. PATENT DOCUMENTS

| | | | | |
|---|---|---|---|---|
| 2005/0246684 | A1* | 11/2005 | Shiraishi | G06F 3/1284 717/115 |
| 2008/0204806 | A1* | 8/2008 | Tao | G06K 15/1851 358/1.16 |
| 2015/0036190 | A1* | 2/2015 | Fukasawa | G06K 15/4065 358/1.15 |
| 2019/0075214 | A1* | 3/2019 | Baba | H04N 1/00816 |
| 2021/0097359 | A1* | 4/2021 | Shigeoka | G06K 15/128 |

FOREIGN PATENT DOCUMENTS

| | | |
|---|---|---|
| JP | 2008071265 A | 3/2008 |
| JP | 201544400 A | 3/2015 |

* cited by examiner

*Primary Examiner* — Gabriel I Garcia
(74) *Attorney, Agent, or Firm* — Alleman Hall Creasman & Tuttle LLP

(57) ABSTRACT

A division line number setting portion sets a division line number for each page image. A band dividing portion divides data of each page image into pieces of band data each of which is composed of data of as many line images as the division line number. A band number setting portion sets a specific band number in response to the division line number. A primary conveyance event outputting portion, in synchronization with a start of data processing for each page image, instructs to start a primary conveyance of a sheet to a resist position. A secondary conveyance event outputting portion, in synchronization with an end of data processing on as many pieces of band data as the specific band number from the $1^{st}$ piece of band data for each page image, instructs to start a secondary conveyance the sheet from the resist position to pass a transfer position.

4 Claims, 5 Drawing Sheets

IMAGE FORMING APPARATUS TO IMPROVE THE SPEED OF THE COPYING PROCESS

INCORPORATION BY REFERENCE

This application is based upon and claims the benefit of priority from the corresponding Japanese Patent Application No. 2019-176498 filed on Sep. 27, 2019, the entire contents of which are incorporated herein by reference.

BACKGROUND

The present disclosure relates to an image forming apparatus that divides data of a page image into a plurality of pieces of band data to process the data.

In an image forming apparatus, it is typical that a processor such as a CPU (Central Processing Unit) and an image processing device including an ASIC (Application Specific Integrated Circuit) process image data in cooperation with each other.

For example, the processor receives a print job from a host apparatus, generates data of a plurality of page images from the print job, and divides data of each page image into a plurality of pieces of band data that is each composed of data of a plurality of line images.

In the following description, the number of line images corresponding to the band data, namely, the number of pieces of data of line images included in a piece of band data, is referred to as a division line number.

Furthermore, the processor executes processes related to the user interface, such as a process to detect a user operation performed on an operation device, and a process to control a display device.

On the other hand, the image processing device acquires a plurality of pieces of band data from the processor, and generates secondary data for each piece of band data by performing image processing such as a rotation process or an aggregation process on each piece of band data.

Furthermore, each time the image processing device generates a piece of secondary data, the image processing device generates an interrupt to the processor. In response to the interrupt, the processor quickly acquires and transmits the pieces of secondary data to a print engine that controls a print device.

In addition, there is known an information processing apparatus that, in order to reduce the load of the image forming apparatus, changes the complexity of the print job based on the load of the CPU of the information processing apparatus and the load of the processing of the image forming apparatus.

On the other hand, an image forming apparatus including an image reading device can execute a copy process. In such an image forming apparatus, to improve the speed of the copy process, a sheet conveyance device may start conveying a sheet to an image transfer position before the image reading device finishes reading image of one page of a document sheet.

For example, there is known an image forming apparatus that, during the copy process, controls the timing of conveying a sheet based on the size and orientation of the sheet.

SUMMARY

An image forming apparatus according to an aspect of the present disclosure includes an image reading device, a sheet conveying device, a processor, an image processing device, and a transfer device. The image reading device executes a continuous reading process to scan a plurality of document sheets, while sequentially reading a plurality of line images from each of the document sheets and sequentially outputting data of the line images. The sheet conveying device executes: a primary conveyance in which to convey a sheet from a sheet storage portion to a resist position and temporarily stop the sheet at the resist position; and a secondary conveyance in which to convey the sheet from the resist position along a path that passes a transfer position. The processor, in parallel to the continuous reading process, divides data of a plurality of line images corresponding to a page image of each of the document sheets, into a plurality of pieces of band data each of which is composed of data of a certain number of line images. The image processing device generates a piece of secondary data for each of the plurality of pieces of band data by acquiring the plurality of pieces of band data from the processor and performing image processing to the plurality of pieces of band data, and generates an interrupt to the processor each time of generating a piece of secondary data. The transfer device transfers a toner image formed based on the secondary data, to the sheet at the transfer position. The processor includes a division line number setting portion, a band dividing portion, a band number setting portion, a primary conveyance event outputting portion, and a secondary conveyance event outputting portion. The division line number setting portion sets, for each of page images of the document sheets, a division line number representing a number of line images based on contents of one or more predetermined reference parameters related to load of the processor. The band dividing portion divides data of each of the page images into the plurality of pieces of band data each of which is composed of data of as many line images as the division line number. The band number setting portion sets a specific band number in response to the division line number for each of the page images, the specific band number being smaller than a number of the plurality of pieces of band data divided from a page image. The primary conveyance event outputting portion outputs, in synchronization with a start of predetermined data processing on a $1^{st}$ piece of band data for each of the page images, a primary conveyance event that instructs the sheet conveying device to start the primary conveyance. The secondary conveyance event outputting portion outputs, in synchronization with an end of the predetermined data processing on as many pieces of band data as the specific band number from the $1^{st}$ piece of band data for each of the page images, a secondary conveyance event that instructs the sheet conveying device to start the secondary conveyance.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 10]

Figure 1:
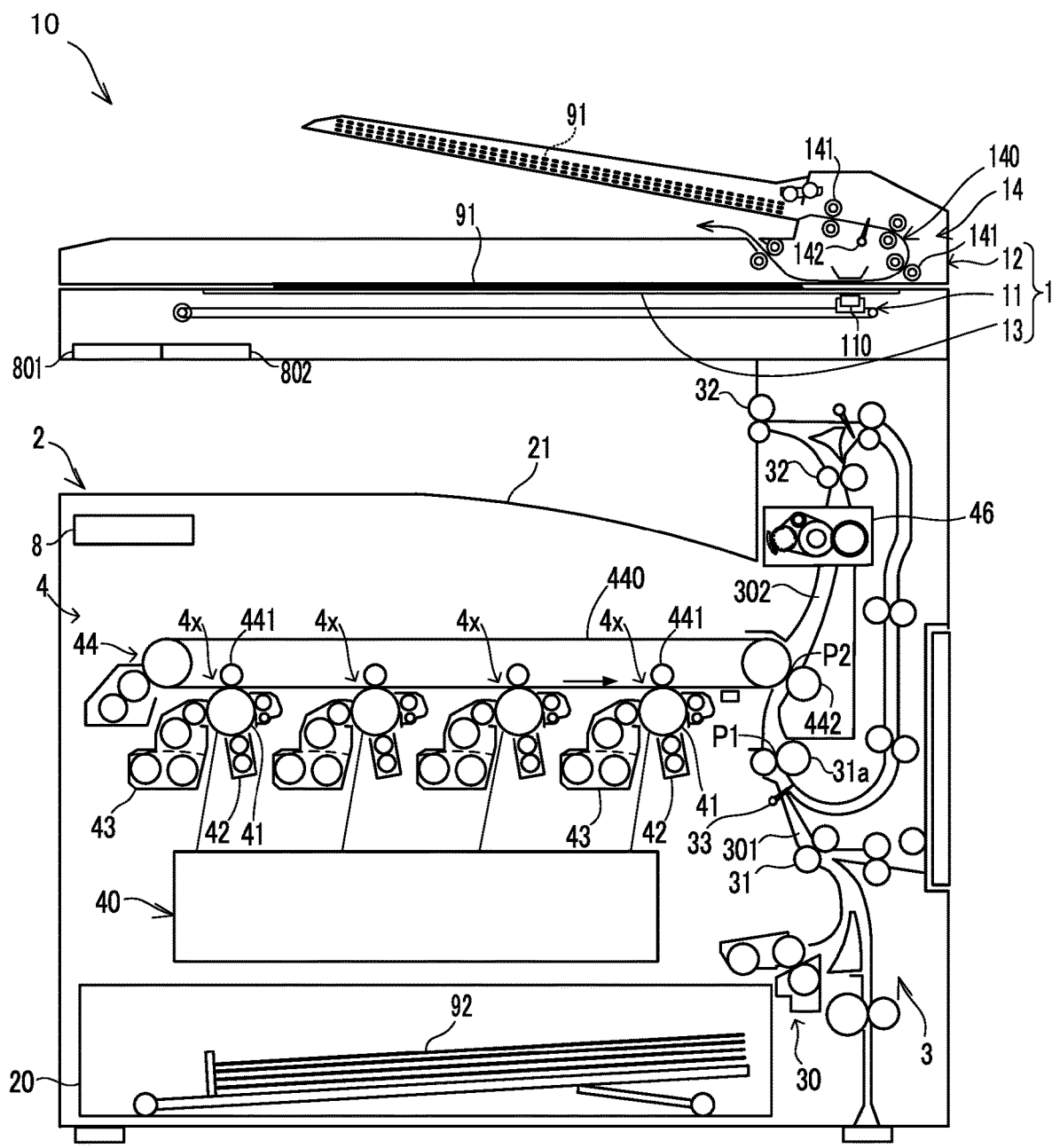
FIG. 1 is a configuration diagram of an image forming apparatus according to an embodiment.

An image forming apparatus 10 according to the embodiment is configured to execute a print process to form an image on a sheet 92, and an image reading process to read an image from a document sheet 91 (see FIG. 1).

For example, the image forming apparatus 10 is a copier, a facsimile apparatus, or a multifunction peripheral. The sheet 92 is a recording medium for recording an image, and is a paper sheet, a synthetic resin sheet or the like.

As shown in FIG. 1, the image forming apparatus 10 includes an image reading device 1 for executing the image reading process, a sheet conveying device 3 for conveying the sheet 92, a print device 4 for executing the print process, and a control device 8. The sheet conveying device 3 and the print device 4 are provided inside a main body portion 2.

The image subjected to the print process is an image read by the image reading device 1 or an image contained in a print job received from a host apparatus (not shown).

That is, the image forming apparatus 10 is configured to execute a copy process that includes the image reading process and a print process that is based on an image read from the document sheet 91 in the image reading process. In the following description, a print process that is based on a print job received from the host apparatus is referred to as a reception print process.

The control device 8 is configured to execute various types of data processing related to the copy process, the reception print process or the like, and control the image reading device 1, the sheet conveying device 3, and the print device 4.

As shown in FIG. 1, the image reading device 1 includes a platen glass 13, an image sensor unit 110, a carriage moving device 11, and a platen cover 12.

The platen cover 12 covers the platen glass 13 and the document sheet 91 placed on the platen glass 13. The image reading device 1 further includes an ADF (Auto Document Feeder) 14 embedded in the platen cover 12. The ADF 14 conveys a plurality of document sheets 91 one by one along a document sheet conveyance path 140.

The ADF 14 includes a plurality of document sheet conveying rollers 141 that are rotationally driven by a motor (not shown). Rotationally driven, the plurality of document sheet conveying rollers 141 convey a document sheet 91 along the document sheet conveyance path 140.

The document sheet 91 is placed on the platen glass 13 or conveyed by the ADF 14. The image reading device 1 is configured to execute a table reading process or a continuous reading process, wherein in the table reading process, an image is read from the document sheet 91 placed on the platen glass 13, and in the continuous reading process, images are read from a plurality of document sheets 91 conveyed by the ADF 14.

In the table reading process, the carriage moving device 11 moves the image sensor unit 110 along the platen glass 13 such that the image sensor unit 110 scans the document sheet 91 placed on the platen glass 13.

In the continuous reading process, the carriage moving device 11 holds the image sensor unit 110 at a position that, in the document sheet conveyance path 140, faces a predetermined reading position. Furthermore, the ADF 14 conveys the document sheet 91 along the document sheet conveyance path 140, thereby the image sensor unit 110 scans the document sheet 91 that passes the reading position.

In the continuous reading process, the image reading device 1 scans the plurality of document sheets 91, while sequentially reading a plurality of line images from each of the document sheets 91 and sequentially outputting data of the read line images.

The sheet conveying device 3 executes a primary conveyance and a secondary conveyance. In the primary conveyance, the sheet conveying device 3 conveys the sheet 92 from a sheet storage portion 20 along a first sheet conveyance path 301 up to a resist position P1 and temporarily stops the sheet 92 at the resist position P1. In the secondary conveyance, the sheet conveying device 3 conveys the sheet 92 from the resist position P1 along a second sheet conveyance path 302 that passes a transfer position P2. Furthermore, the sheet conveying device 3, by the secondary conveyance, discharges the sheet 92 from the second sheet conveyance path 302 to a discharge tray 21.

Specifically, the sheet conveying device 3 includes a sheet feed mechanism 30, a plurality of first sheet conveyance rollers 31, a plurality of second sheet conveyance rollers 32, and a sheet sensor 33. The plurality of first sheet conveyance rollers 31 includes a resist roller 31a that temporarily stops the sheet 92.

The sheet feed mechanism 30 feeds the sheet 92 from the sheet storage portion 20 to the first sheet conveyance path 301. The first sheet conveyance rollers 31 take over the conveyance of the sheet 92 from the sheet feed mechanism 30, and convey the sheet 92 along the first sheet conveyance path 301 to the resist position P1. Subsequently, the resist roller 31a temporarily stops the sheet 92 at the resist position P1.

The resist roller 31a is located at the resist position P1. The sheet sensor 33 detects the sheet 92 in the first sheet conveyance path 301. The sheet sensor 33 is located upstream of the resist position P1 in the sheet conveyance direction.

The control device 8 temporarily stops the resist roller 31a after a predetermined time passes from the time when the sheet sensor 33 detects the sheet 92. This allows the sheet 92 to be temporarily stopped at the resist position P1.

In the present embodiment, the print device 4 executes the print process by the electrophotographic method. The print device 4 includes an image creating device 4x, a laser scanning unit 40, a transfer device 44, and a fixing device 46.

In the image creating device 4x, a drum-like photoconductor 41 rotates, and a charging device 42 electrically charges the surface of the photoconductor 41 uniformly. Furthermore, the laser scanning unit 40 writes an electrostatic latent image on the charged surface of the photoconductor 41.

Furthermore, a developing device 43 of the image creating device 4x develops the electrostatic latent image as a toner image. The transfer device 44 transfers the toner image from the surface of the photoconductor 41 to the sheet 92 at the transfer position P2 in the second sheet conveyance path 302.

Subsequently, the fixing device 46 heats and pressurizes the toner image on the sheet 92 at a position located downstream of the transfer position P2 in the sheet conveyance direction in the second sheet conveyance path 302. With the heating and pressurizing, the fixing device 46 fixes the toner image to the sheet 92.

As shown in FIG. 1, the main body portion 2 includes a tandem-type print device 4. As a result, the print device 4 includes four image creating devices 4x that correspond to different colors of toner. Furthermore, the transfer device 44 includes four primary transfer devices 441, an intermediate transfer belt 440, and a secondary transfer device 442.

Each of the four image creating devices 4x includes the photoconductor 41, the charging device 42, and the developing device 43. The four image creating devices 4x respectively form toner images of different colors on the surfaces of the photoconductors 41.

In each of the image creating devices 4x, the primary transfer device 441 transfers the toner image from the photoconductor 41 to the intermediate transfer belt 440. This allows a color image composed of toner images of four colors to be formed on the intermediate transfer belt 440.

The secondary transfer device 442 transfers the toner images of four colors from the intermediate transfer belt 440 to the sheet 92 at the transfer position P2.

Figure 2:
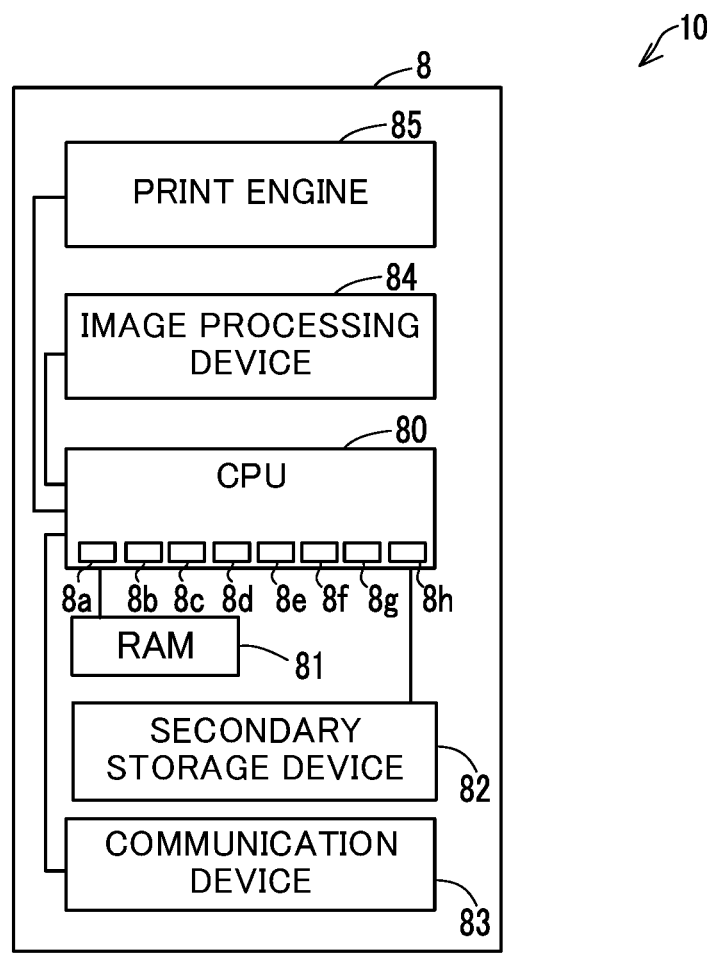
FIG. 2 is a block diagram showing a configuration of a control device in the image forming apparatus according to the embodiment.

As shown in FIG. 2, the control device 8 includes a CPU (Central Processing Unit) 80, a RAM (Random Access Memory) 81, a secondary storage device 82, a communication device 83, an image processing device 84, and a print engine 85.

The communication device 83 performs a communication with other apparatuses such as the host apparatus via a network such as a LAN (Local Area Network). The CPU 80 executes data transmissions and receptions to/from other apparatuses all via the communication device 83.

The CPU 80 is a main processor of the image forming apparatus 10. The CPU 80 includes a plurality of processing modules. The processing modules are implemented when the CPU 80 executes different computer programs.

In the present embodiment, the plurality of processing modules include a main control portion 8a, a reading control portion 8b, a conveyance control portion 8c, a page image generating portion 8d, an area dividing portion 8e, and a band dividing portion 8f.

The main control portion 8a is configured to execute processes related to the user interface, such as a process to detect a user operation performed on an operation device 801, and a process to control a display device 802. The operation device 801 includes, for example, a touch panel or operation buttons. The display device 802 is, for example, a panel display device such as a liquid crystal display panel.

The reading control portion 8b controls the image reading device 1. For example, the image reading device 1 moves the carriage moving device 11 upon receiving from the main control portion 8a a command to start the table reading process.

In addition, upon receiving from the main control portion 8a a command to start the continuous reading process, the image reading device 1 causes the carriage moving device 11 to operate such that the image sensor unit 110 is located at the position facing the reading position, and causes the ADF 14 to operate.

The conveyance control portion 8c controls the sheet conveying device 3. For example, in order to improve the speed of the copy process including the continuous reading process, the conveyance control portion 8c causes the sheet conveying device 3 to start the secondary conveyance, before the image reading device 1 finishes reading image of one page of the document sheet 91.

The band dividing portion 8f, cooperating with the image processing device 84, executes, in the copy process, a process to sequentially acquire data of a plurality of line images read from the document sheet 91 from the image sensor unit 110 of the image reading device 1, and generate, from the acquired data of the plurality of line images, image data used in the print process.

For example, in the copy process including the continuous reading process, the page image generating portion 8d, in parallel to the continuous reading process, sequentially acquires the data of the plurality of line images output from the image sensor unit 110.

Each time the band dividing portion 8f acquires predetermined m pieces of data of line images, the band dividing portion 8f outputs a piece of band data that is composed of the m pieces of data of line images, to the image processing device 84.

The image processing device 84 generates secondary data by acquiring the band data from the CPU 80 and performing image processing such as a rotation process or an aggregation process to the band data. The content of the image processing performed on the band data is preliminarily specified by the CPU 80.

That is, the image processing device 84 generates a piece of secondary data for each piece of band data. Each time it generates a piece of secondary data, the image processing device 84 generates an interrupt to the CPU 80 and passes the piece of secondary data to the CPU 80.

In response to the interrupt, the main control portion 8a quickly acquires and transmits the piece of secondary data to the print engine 85. The print device 4 forms, on the sheet 92, a toner image based on the secondary data. That is, the transfer device 44 transfers the toner image formed based on the secondary data, to the sheet 92 at the transfer position P2.

That is, during a time period where the image sensor unit 110 outputs data of line images of one page of the document sheet 91, the band dividing portion 8f acquires, from the image sensor unit 110, data of a plurality of page images corresponding to a plurality of document sheets 91. The data of each page image is data of line images read from one page of the document sheet 91.

Accordingly, in a case where N pieces of line images are read from one page of the document sheet 91, and a piece of band data is composed of m pieces of data of line images, the band dividing portion 8f divides each piece of data of page image into (N/m) pieces of band data. It is noted that when N is not an integer multiple of m, a piece of band data lastly divided from a piece of data of page image includes less than m pieces of data of line images.

In addition, when the main control portion 8a receives a print job from the host apparatus in the reception print process, the page image generating portion 8d, the area dividing portion 8e, and the band dividing portion 8f, cooperating with the image processing device 84, generate, from the print job, the image data that is used in the print process.

In the reception print process, the page image generating portion 8*d* acquires the print job via the main control portion 8*a*. The print job includes one or more pieces of original page data that represent one or more page images that are the target of the print process. For example, the original page data is PDL (Page Description Language) data.

When the print job includes a plurality of pieces of page data, the page image generating portion 8*d* generates a plurality of pieces of data of page images from a plurality of pieces of original page data. For example, the data of page images is raster data.

The area dividing portion 8*e* divides the original page data into character area data and non-character area data before the page image generating portion 8*d* generates the data of page images. The page image generating portion 8*d* generates the data of page images based on the result of the area division by the area dividing portion 8*e*.

Subsequently, the band dividing portion 8*f* acquires data of a plurality of page images generated by the page image generating portion 8*d*. Furthermore, the band dividing portion 8*f* divides each piece of data of page image into (N/m) pieces of band data.

As in the copy process, the image processing device 84 generates the secondary data by performing image processing such as the rotation process or the aggregation process to the band data. In this case, each time the image processing device 84 generates a piece of secondary data, the image processing device 84 generates an interrupt to the CPU 80 and passes the piece of secondary data to the CPU 80.

As in the copy process, in response to the interrupt, the main control portion 8*a* quickly acquires and transmits the piece of secondary data to the print engine 85.

The image processing device 84 performs image processing such as the rotation process or the aggregation process to image data acquired via the CPU 80, and passes the data after the processing to the CPU 80. For example, the image processing device 84 is a circuit such as an ASIC (Application Specific Integrated Circuit). In addition, the image processing device 84 may be a processor such as a MPU or a DSP that is different from the CPU 80.

The print engine 85 causes the print device 4 to execute the print process by controlling the print device 4 in accordance with a command from the CPU 80.

The print engine 85 is a processor such as a MPU or a DSP, or a circuit such as an ASIC that are not shown.

The secondary storage device 82 is a computer-readable nonvolatile storage device. The secondary storage device 82 is configured to store computer programs and various types of data that are consulted by the CPU 80. For example, either a hard disk drive or a SSD (Solid State Drive), or a combination of both is adopted as the secondary storage device 82.

The CPU 80 is a processor that executes various types of data processing and controls by executing the computer programs stored in the secondary storage device 82. It is noted that another processor such as a DSP may execute the data processing and controls in place of the CPU 80.

The RAM 81 is a computer-readable volatile storage device. The RAM 81 temporarily stores a computer program executed by the CPU 80, and data that is output and consulted by the CPU 80 during execution of the computer program.

In the following description, the number of line images corresponding to the band data, namely, the number of pieces of data of line images included in a piece of band data is referred to as a division line number Ld1.

Meanwhile, the less the division line number Ld1, the smaller the size of the band data that is the target of a pipeline process performed by the CPU 80. As a result, as the division line number Ld1 becomes less, the time required by the CPU 80 to process the data of page images becomes shorter, and the productivity of the copy process and the print process increases.

On the other hand, the less the division line number Ld1, the more the number of interrupts of the image processing device 84 to the CPU 80. This increases the load of the CPU 80.

As described above, the CPU 80, as the main processor, executes the processes related to the image processing device 84, as well as various processes such as those related to the user interface and the print engine 85. As a result, when the CPU 80 is overloaded, various problems may occur such as a delayed response of the user interface, and a suspension of the print process.

Figure 3:
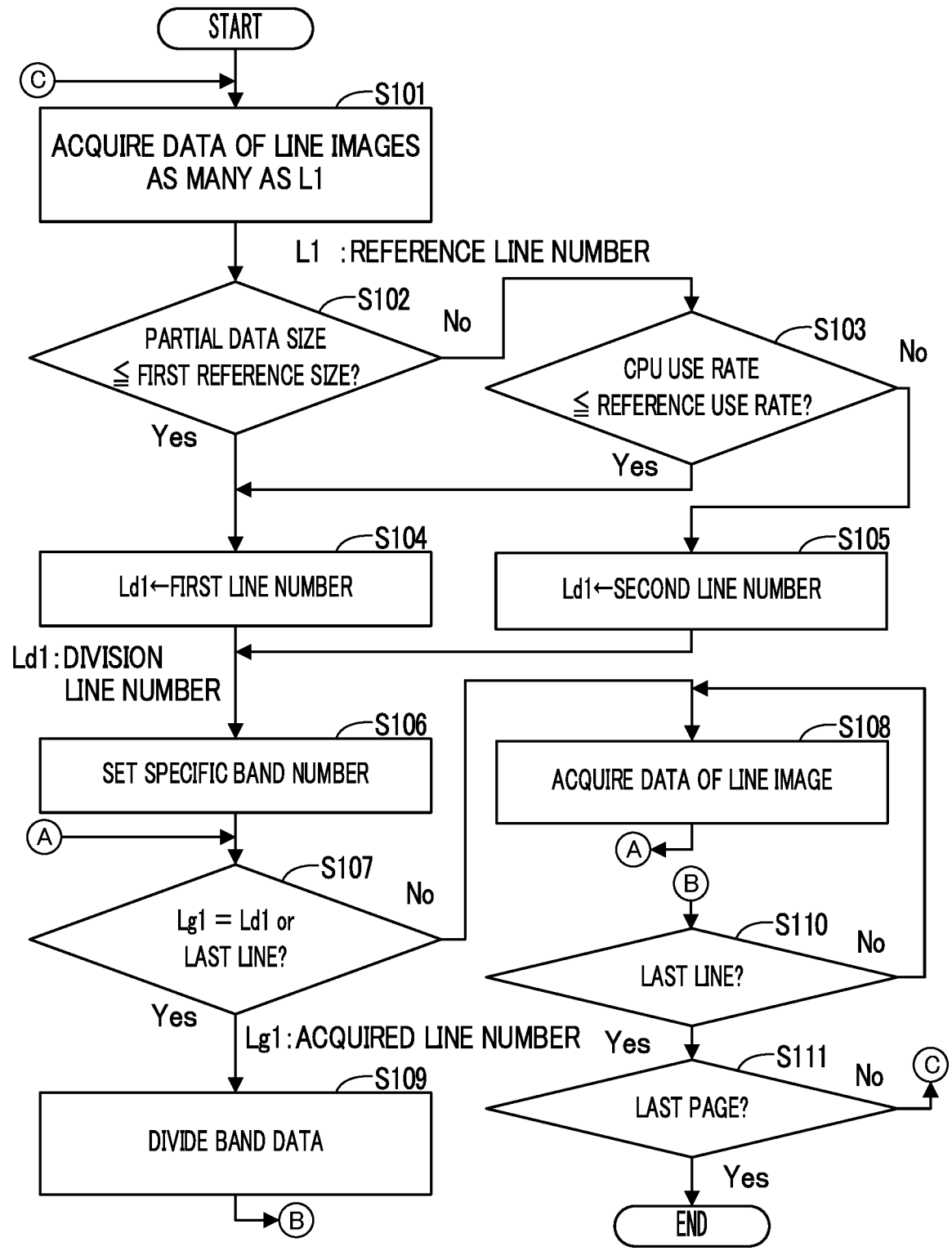
FIG. 3 is a flowchart showing an example of a procedure of a first band division process in a copy process executed in the image forming apparatus according to the embodiment.
Figure 4:
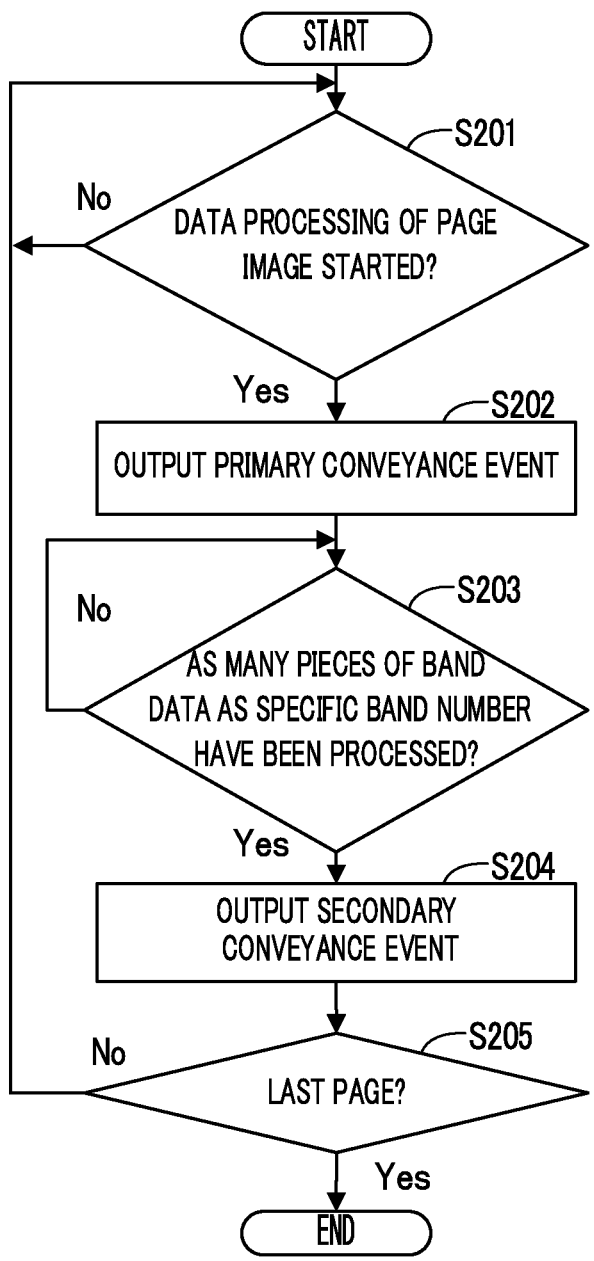
FIG. 4 is a flowchart showing an example of a procedure of a sheet conveyance control in the copy process executed in the image forming apparatus according to the embodiment.

In the image forming apparatus 10, when the copy process including the continuous reading process is executed, the CPU 80 executes a first band division process shown in FIG. 3, and a sheet conveyance control shown in FIG. 4.

Figure 5:
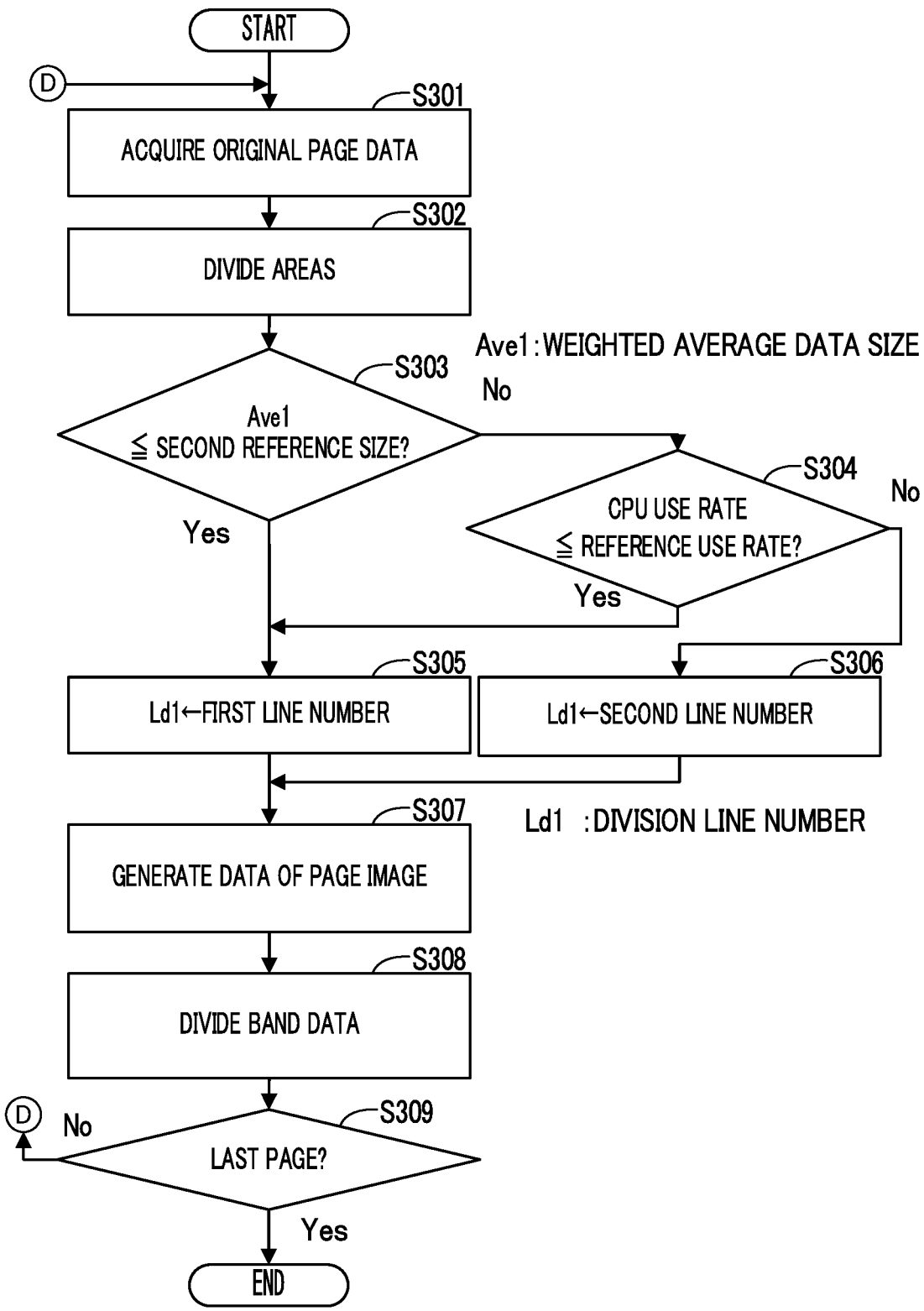
FIG. 5 is a flowchart showing an example of a procedure of a second band division process executed in a print process executed in the image forming apparatus according to the embodiment.

In addition, when the reception print process is executed, the CPU 80 executes a second band division process shown in FIG. 5. Each of the first and second band division processes includes a process to dynamically set the division line number Ld1 depending on the situation.

The CPU 80 executes the processes shown in FIG. 3 to FIG. 5. This allows the image forming apparatus 10 to avoid an overload of the CPU 80. In addition, the CPU 80 executes the process shown in FIG. 4. This makes it possible to control the conveyance of the sheet 92 in such a way as to increase the productivity of the copy process.

The CPU 80 further includes a division line number setting portion 8*g* and a band number setting portion 8*h* as processing modules for executing the first band division process and the second band division process (see FIG. 2).

[First Band Division Process]

The following describes an example of a procedure of the first band division process with reference to the flowchart shown in FIG. 3.

The main control portion 8*a* starts the first band division process when an operation is performed on the operation device 801 to start the copy process including the continuous reading process. As a result, the first band division process is executed in parallel to the continuous reading process. In the following description, S101, S102, . . . are identification signs representing a plurality of steps of the first band division process.

<Step S101>

In the first band division process, first, the band dividing portion 8*f* acquires, from the image reading device 1, data of as many line images as a reference line number L1.

The band dividing portion 8*f* then moves the process to step S102. The data acquired in step S101 is data of as many line images as the reference line number L1 from the start of the document sheet 91 in the scanning direction.

The scanning direction is what is called a sub scanning direction. In the present specification document, the length of the document sheet 91 refers to the size of the document sheet 91 in the scanning direction. It is noted that the width direction of the document sheet 91 is what is called a main scanning direction. The main scanning direction is the longitudinal direction of the image sensor unit 110.

The reference line number L1 is a predetermined number of line images. For example, the reference line number L1 may be a default value of the division line number Ld1.

<Step S102>

In step S102, the division line number setting portion 8g determines whether or not a partial data size is equal to or smaller than a predetermined first reference size, wherein the partial data size is a size of data of as many line images as the reference line number L1.

Upon determining that the partial data size is equal to or smaller than the first reference size, the division line number setting portion 8g moves the process to step S104. Otherwise, the division line number setting portion 8g moves the process to step S103.

<Step S103>

In step S103, the division line number setting portion 8g determines whether or not a use rate of the CPU 80 is equal to or smaller than a predetermined reference use rate. The use rate of the CPU 80 is also referred to as a load rate of the CPU 80. That is, the division line number setting portion 8g determines whether or not the load of the CPU 80 is high.

Upon determining that the use rate of the CPU 80 is equal to or smaller than the reference use rate, the division line number setting portion 8g moves the process to step S104. Otherwise, the division line number setting portion 8g moves the process to step S105.

<Step S104>

In step S104, the division line number setting portion 8g sets, as the division line number Ld1, a predetermined first line number, and moves the process to step S106. The first line number is a default value of the division line number Ld1.

The first line number is equal to or larger than the reference line number L1. In addition, the first line number is smaller than the total number of lines of the image of the document sheet 91.

<Step S105>

In step S105, the division line number setting portion 8g sets, as the division line number Ld1, a predetermined second line number, and moves the process to step S106. The second line number is larger than the first line number.

For example, the second line number is double the first line number. More specifically, for example, the first line number is 128, and the second line number is 256.

<Step S106>

In step S106, the band number setting portion 8h sets a specific band number in response to the division line number Ld1 set in step S104 or S105, and moves the process to step S107. A concrete method for deriving the specific band number is described below.

As described below, the specific band number is a control parameter that is used to control the secondary conveyance. In the sheet conveyance control shown in FIG. 4, the conveyance control portion 8c controls the timing of the secondary conveyance of the sheet 92 based on specific band number, for each page of the document sheet 91.

<Step S107>

In step S107, the band dividing portion 8f determines whether or not an acquired line number Lg1 matches the division line number Ld1, wherein the acquired line number Lg1 is the acquired number of pieces of data of line images. Upon determining that the acquired line number Lg1 matches the division line number Ld1, the band dividing portion 8f moves the process to step S109.

In addition, even when the acquired line number Lg1 does not match the division line number Ld1, if the most recently acquired piece of data of line image is a piece of data of the last line image in each page of the document sheet 91, the band dividing portion 8f moves the process to step S109.

On the other hand, when the acquired line number Lg1 does not match the division line number Ld1, and the most recently acquired piece of data of line image is not a piece of data of the last line image in each page of the document sheet 91, the band dividing portion 8f moves the process to step S108.

<Step S108>

In step S108, the band dividing portion 8f acquires a next piece of data of line image from the image reading device 1, and moves the process to step S107. This allows the band dividing portion 8f to repeat acquiring a piece of data of line image until the acquired line number Lg1 matches the division line number Ld1.

It is noted that the band dividing portion 8f counts up the acquired line number Lg1 each time it acquires a piece of data of line image in step S101 or S108. Furthermore, when it determines in step S107 that the acquired line number Lg1 matches the division line number Ld1, or that the most recently acquired piece of data of line image is a piece of data of the last line image in each page of the document sheet 91, the band dividing portion 8f initializes the acquired line number Lg1 to zero.

<Step S109>

In step S109, the band dividing portion 8f divides data of as many line images as the division line number Ld1 as one piece of band data, and outputs the divided piece of band data to the image processing device 84. Thereafter, the band dividing portion 8f moves the process to step S110.

The image processing device 84 acquires a piece of band data from the CPU 80 in step S109, generates the secondary data by performing image processing on the acquired piece of band data, and then generates an interrupt to the CPU 80.

<Step S110>

In step S110, when the band dividing portion 8f determines that the most recently acquired piece of data of line image is a piece of data of the last line image in each page of the document sheet 91, the band dividing portion 8f moves the process to step S111. Otherwise, the band dividing portion 8f moves the process to step S108.

<Step S111>

In step S111, when the most recently acquired piece of data of line image is a piece of data of the last line image in the last page of the document sheet 91, the band dividing portion 8f ends the first band division process. Otherwise, the band dividing portion 8f moves the process to step S101.

As described above, the division line number setting portion 8g sets, for each page image, the division line number Ld1 representing the number of line images based on the size of data of as many line images as the reference line number L1 and the use rate of the CPU 80 (see steps S102 to S105 in FIG. 3).

In general, the larger the size of data of page image, the larger the load of the CPU 80. The partial data size is a substitution value of the size of data of page image. In addition, the use rate of the CPU 80 is the load of the CPU 80 itself. That is, the partial data size and the use rate of the CPU 80 are examples of reference parameters related to the load of the CPU 80.

Specifically, the division line number setting portion 8g sets, as the division line number Ld1, the first line number or the second line number depending on whether or not the partial data size exceeds the first reference size, wherein the second line number is larger than the first line number (see steps S102, S104, and S105 in FIG. 3).

In addition, the division line number setting portion 8g sets, as the division line number Ld1, the first line number or the second line number depending on whether or not the use rate of the CPU 80 exceeds the reference use rate (see steps S103, S104, and S105 in FIG. 3).

That is, when the content of the reference parameter indicates that the load of the CPU 80 is high, the division line number setting portion 8g sets, as the division line number Ld1, the second line number that is larger than the first line number. Otherwise, the division line number setting portion 8g sets the first line number as the division line number Ld1.

The band dividing portion 8f then divides the data of each page image into a plurality of pieces of band data, wherein each piece of band data is composed of data of as many line images as the division line number Ld1 (see step S109 in FIG. 3).

For example, in a case where the length of the page image is the length of the long side of the A4 size paper sheet, and the resolution of the page image is 600 dpi, one page of the page image includes 3,508 line images.

In the above-described case, when the division line number Ld1 is set to 128, the image of page image is divided into 55 pieces of band data, and when the division line number Ld1 is set to 256, the image of page image is divided into 28 pieces of band data.

As a result, when the division line number Ld1 is set to double the standard value, the number of occurrences of an interrupt to the CPU 80 per page image becomes approximately half. That is, the present embodiment changes the setting of the division line number Ld1 so as to avoid an overload of the CPU 80 and occurrence of problems such as a delayed response of the user interface and a suspension of the print process.

In the image forming apparatus 10, in order to improve the speed of the copy process including the continuous reading process, the conveyance control portion 8c causes the sheet conveying device 3 to start the secondary conveyance before the image reading device 1 finishes reading image of one page of the document sheet 91.

In conventional apparatuses, a constant value is set as the division line number Ld1, and the timing to start the secondary conveyance is uniquely determined in correspondence with each length of the document sheet 91. However, in the image forming apparatus 10, the division line number Ld1 is set dynamically. As a result, a problem occurs if the timing to start the secondary conveyance is controlled based on only the length of the document sheet 91.

In the sheet conveyance control shown in FIG. 4, the timing to start the secondary conveyance is controlled based on the specific band number set in step S106 of FIG. 3. This allows the timing to start the secondary conveyance to be controlled appropriately even when the division line number Ld1 is set dynamically.

[Sheet Conveyance Control]

The following describes an example of a procedure of the sheet conveyance control that is executed when the copy process including the continuous reading process is executed, with reference to the flowchart shown in FIG. 4.

The conveyance control portion 8c starts the sheet conveyance control when the copy process including the continuous reading process is started. In the following description, S201, S202, . . . are identification signs representing a plurality of steps of the sheet conveyance control.

<Step S201>

In the sheet conveyance control, first, the conveyance control portion 8c determines whether or not data processing of the page image has been started. For example, the conveyance control portion 8c determines that data processing of the page image has been started when the band dividing portion 8f has acquired data of the first line image of the document sheet 91.

Upon determining that data processing of the page image has been started, the conveyance control portion 8c moves the process to step S202.

<Step S202>

In step S202, the conveyance control portion 8c outputs a primary conveyance event that instructs the sheet conveying device 3 to start the primary conveyance, and moves the process to step S203. In response to the output of the primary conveyance event, the sheet conveying device 3 conveys the sheet 92 from the sheet storage portion 20 to the resist position P1, and temporarily stops the sheet 92 at the resist position P1.

For example, the conveyance control portion 8c outputs the primary conveyance event to the print engine 85. This allows the print engine 85 to cause the sheet conveying device 3 to execute the primary conveyance.

<Step S203>

In step S203, the conveyance control portion 8c determines whether or not as many pieces of band data as the specific band number have been processed. The specific band number is set for each page image in step S106 of FIG. 3.

For example, the conveyance control portion 8c determines for each page image that as many pieces of band data as the specific band number have been processed when the image processing device 84 has generated as many interrupts as the specific band number.

Upon determining that as many pieces of band data as the specific band number have been processed, the conveyance control portion 8c moves the process to step S204.

<Step S204>

In step S204, the conveyance control portion 8c outputs a secondary conveyance event that instructs the sheet conveying device 3 to start the secondary conveyance, and moves the process to step S205. In response to the output of the secondary conveyance event, the sheet conveying device 3 conveys the sheet 92 from the resist position P1 along the second sheet conveyance path 302 that passes the transfer position P2.

<Step S205>

In step S205, the conveyance control portion 8c determines whether or not the secondary conveyance event output in step S204 is a secondary conveyance event corresponding to a page image of the last page.

Upon determining that the secondary conveyance event output in step S204 is a secondary conveyance event corresponding to a page image of the last page, the conveyance control portion 8c ends the sheet conveyance control. Otherwise, the conveyance control portion 8c moves the process to step S201.

As a result, the conveyance control portion 8c repeats the processes of steps S201 to S205 sequentially for each page image until the secondary conveyance event corresponding to the page image of the last page is output.

[Method for Deriving Specific Band Number]

The following describes a concrete method for deriving the specific band number.

For deriving the specific band number, first, a document sheet scanning time and a page print time are derived.

The document sheet scanning time is a time period required for the image reading device 1 to read page image from a page of the document sheet 91 in the continuous reading process. The page print time is a time period required to transfer a page image to the sheet 92 at the transfer position P2.

In general, the document sheet scanning time is longer than the page print time. In the image forming apparatus 10, too, the document sheet scanning time is longer than the page print time. As a result, if the secondary conveyance is started in synchronization with the start of the image processing on data of the page image, acquisition of data of line images lags behind in the middle of the print process.

The document sheet scanning time is derived by dividing the length of the document sheet 91 by a document sheet conveyance speed. The length of the document sheet 91 is a size in the scanning direction of the document sheet 91, and is the length of the page image. The document sheet conveyance speed is a speed at which the ADF 14 conveys the document sheet 91. The document sheet conveyance speed is a known value.

For example, the length of the page image may be input preliminarily via the operation device 801.

In addition, as shown in FIG. 1, the ADF 14 may include a document sheet sensor 142 arranged in the document sheet conveyance path 140. In this case, the conveyance control portion 8*c* may derive the length of the document sheet 91 from a document sheet passing time that is a time at which the document sheet 91 passes the document sheet sensor 142. The document sheet passing time is a time period that extends from a time when the document sheet sensor 142 starts detecting the document sheet 91 to a time when the document sheet sensor 142 stops detecting the document sheet 91.

On the other hand, the page print time is derived by dividing the length of the page image by a secondary conveyance speed. As described above, the length of the page image is the length of the document sheet 91. The secondary conveyance speed is a speed at which the sheet 92 is conveyed when the sheet conveying device 3 performs the secondary conveyance. The secondary conveyance speed is a known value.

For deriving the specific band number, a time difference between scan and print and a band scanning time are further derived.

The time difference between scan and print is a difference between the document sheet scanning time and the page print time. The band scanning time is a time period for which the document sheet 91 is scanned to acquire a piece of band data.

The band scanning time is derived by multiplying the division line number Ld1 by the resolution of the page image and further dividing the multiplication result by the document sheet conveyance speed.

In addition, the specific band number is derived by dividing the time difference between scan and print by the band scanning time, or by dividing a result value of adding a predetermined adjustment constant to the time difference between scan and print, by the band scanning time. It noted here that, in deriving the specific band number, a fraction less than one is rounded up. The specific band number is smaller than the number of pieces of band data divided from a page image.

For example, in a case where the length of the document sheet 91 is the length of the long side of the A4 size paper sheet, and the resolution of the page image is 600 dpi, the number of pieces of band data divided from a page image is 55 when the division line number Ld1 is 128. In this case, the specific band number is well smaller than 55.

Similarly, in a case where the length of the document sheet 91 is the length of the long side of the A4 size paper sheet, and the resolution of the page image is 600 dpi, the number of pieces of band data divided from a page image is 28 when the division line number Ld1 is 256. In this case, the specific band number is well smaller than 28.

In step S106 of FIG. 3, the band number setting portion 8*h* may derive the specific band number based on the division line number Ld1 and the length of the document sheet 91 in the scanning direction.

In addition, a plurality of candidate values for the specific band number may be stored in the secondary storage device 82 for each combination of values of the division line number Ld1 and the length of document sheet 91 in the scanning direction. In this case, in step S106 of FIG. 3, the band number setting portion 8*h* selects one of the plurality of candidate values as the specific band number in correspondence with a combination of values of the division line number Ld1 and the length of document sheet 91 in the scanning direction.

As described above, the band number setting portion 8*h* sets, as the specific band number, a value smaller than the number of pieces of band data divided from a page image, based on the division line number Ld1 for each page image (see step S106 in FIG. 3).

The conveyance control portion 8*c* then outputs, in synchronization with a start of predetermined data processing on the first piece of band data for each page image, the primary conveyance event that instructs the sheet conveying device 3 to start the primary conveyance (see steps S201 and S202 in FIG. 4). It is noted that the conveyance control portion 8*c* executing the process of step S202 is an example of a primary conveyance event outputting portion.

Furthermore, the conveyance control portion 8*c* outputs, in synchronization with an end of predetermined data processing on as many pieces of band data as the specific band number from the first piece of band data for each page image, the secondary conveyance event that instructs the sheet conveying device 3 to start the secondary conveyance (see steps S203 and S204 in FIG. 4). It is noted that the conveyance control portion 8*c* executing the process of step S204 is an example of a secondary conveyance event outputting portion.

The processes of the band number setting portion 8*h* and the conveyance control portion 8*c* allow the conveyance of the sheet 92 to be controlled appropriately so as to increase the productivity of the copy process even under a circumstance where the frequency of the interrupt from the image processing device 84 to the CPU 80 is controlled depending on the Situation.

[Second Band Division Process]

The following describes an example of a procedure of the second band division process with reference to the flowchart shown in FIG. 5. As described above, the second band division process is executed when the reception print process is executed.

The main control portion 8*a* starts the second band division process upon reception of a print job from the host apparatus. In the following description, S301, S302, . . . are identification signs representing a plurality of steps of the second band division process.

<Step S301>

In the second band division process, first, the area dividing portion 8*e* acquires original page data of one page included in the print job.

<Step S302>

Furthermore, the area dividing portion 8e divides the original page data into character area data and non-character area data.

<Step S303>

Subsequently, the division line number setting portion 8g determines whether or not a weighted average data size Ave1 is equal to or smaller than a predetermined second reference size.

The weighted average data size Ave1 is a weighted average value of the size of the character area data and the size of the non-character area data in the original page data. Here, the weight coefficient of the size of the non-character area is larger than the weight coefficient of the size of the character area data. The weighted average data size Ave1 is an example of the size of the original page data.

Upon determining that the weighted average data size Ave1 is equal to or smaller than the second reference size, the division line number setting portion 8g moves the process to step S305. Otherwise, the division line number setting portion 8g moves the process to step S304.

<Step S304>

In step S304, the division line number setting portion 8g determines whether or not the use rate of the CPU 80 is equal to or smaller than the reference use rate. The determination process is the same as the process of step S103 of FIG. 3.

Upon determining that the use rate of the CPU 80 is equal to or smaller than the reference use rate, the division line number setting portion 8g moves the process to step S305. Otherwise, the division line number setting portion 8g moves the process to step S306.

<Step S305>

In step S305, the division line number setting portion 8g sets the first line number as the division line number Ld1, and moves the process to step S307. The first line number is a default value of the division line number Ld1.

<Step S306>

In step S306, the division line number setting portion 8g sets the second line number as the division line number Ld1, and moves the process to step S307. The second line number is larger than the first line number.

<Step S307>

In step S307, the page image generating portion 8d generates data of the page image from the original page data, and moves the process to step S308.

In step S307, the page image generating portion 8d generates the data of the page image by applying different processes to the character area data and the non-character area data in the original page data. For example, the page image generating portion 8d processes the character area data as vector data, and processes the non-character area data as raster data.

<Step S308>

In step S308, the band dividing portion 8f divides the data of the page image into a plurality of pieces of band data, wherein each piece of band data is composed of data of as many line images as the division line number Ld1.

The band dividing portion 8f sequentially outputs the divided pieces of band data to the image processing device 84. Thereafter, the band dividing portion 8f moves the process to step S309.

The image processing device 84 sequentially acquires the pieces of band data from the CPU 80 in step S308, generates the secondary data by performing image processing on the acquired pieces of band data, and generates an interrupt to the CPU 80 each time it generates the secondary data.

<Step S309>

In step S309, when the most recently acquired piece of original page data is data of the last page, the band dividing portion 8f ends the second band division process. Otherwise, the band dividing portion 8f moves the process to step S301.

Accordingly, the processes of steps S301 to S309 are executed for each of a plurality of pieces of original page data in the print job.

As described above, during the reception print process, the division line number setting portion 8g sets the division line number Ld1 based on the weighted average data size Ave1 and the use rate of the CPU 80 (see steps S303 to S306 in FIG. 5).

Specifically, the division line number setting portion 8g sets, as the division line number Ld1, the first line number or the second line number that is larger than the first line number, depending on whether or not the weighted average data size Ave1 exceeds the second reference size (see steps S303, S305, and S306 in FIG. 5).

In addition, the division line number setting portion 8g sets, as the division line number Ld1, the first line number or the second line number depending on whether or not the use rate of the CPU 80 exceeds the reference use rate (see steps S304, S305, and S306 in FIG. 5).

In the present embodiment, the size of the character area data and the size of the non-character area data are examples of the reference parameter related to the load of the CPU 80. The weighted average data size Ave1 is an example of the size of each piece of original page data included in the print job.

In the reception print process, as in the copy process, the setting of the division line number Ld1 is changed so as to avoid an overload of the CPU 80 and occurrence of problems such as a delayed response of the user interface and a suspension of the print process.

In addition, in the process in which the page image generating portion 8d generates data of page image, a calculation load required to generate data of a part of the page image from the character area data is smaller than a calculation load required to generate data of the remaining part of the page image from the non-character area data.

Accordingly, the weighted average data size Ave1 is a reference parameter that reflects the state of the load of the CPU 80 more accurately than the size of the data of page image.

First Application Example

Next, a description is given of an application example of the process executed by the division line number setting portion 8g in step S303 of FIG. 5.

In the present application example, the division line number setting portion 8g sets the second reference size based on a ratio of the character area or the non-character area to the image area of the original page data.

For example, the second reference size set by the division line number setting portion 8g when the ratio of the character area to the image area is small becomes smaller than when the ratio of the character area to the image area of the original page data is large. Alternatively, the second reference size set by the division line number setting portion 8g when the ratio of the non-character area to the image area is large becomes smaller than when the ratio of the non-character area to the image area is small.

Furthermore, in step S303, when the size of the data of the page image is equal to or smaller than the second reference size, the division line number setting portion 8g moves the process to step S305. Otherwise, the division line number setting portion 8g moves the process to step S304. The size of the original page data is an example of the reference parameter related to the load of the CPU 80.

That is, in the present application example, the division line number setting portion 8g sets, as the division line number Ld1, the first line number or the second line number depending on whether or not the size of each piece of original page data included in the print job exceeds the second reference size, wherein the second line number is larger than the first line number (see steps S303, S305, and S306 in FIG. 5).

In the present application example, the second reference size that is compared with the size of the data of the page image is set based on the ratio of the character area or the non-character area to the image area of the original page data. With this configuration, the state of the load of the CPU 80 is determined more accurately, and the result of the determination is reflected on the setting of the division line number Ld1.

Second Application Example

Next, a description is given of an application example of steps S102 to S105 of FIG. 3 and steps S303 to S306 of FIG. 5.

For example, step S102 or step S103 of FIG. 3 may be omitted. For example, in a case where step S103 of FIG. 3 is omitted, the division line number setting portion 8g sets the first line number as the division line number Ld1 when the partial data size is equal to or smaller than the first reference size. Otherwise, the division line number setting portion 8g sets the second line number as the division line number Ld1.

Similarly, step S303 or step S304 of FIG. 5 may be omitted. For example, in a case where step S303 of FIG. 5 is omitted, the division line number setting portion 8g sets the first line number as the division line number Ld1 when the use rate of the CPU 80 is equal to or smaller than the reference use rate. Otherwise, the division line number setting portion 8g sets the second line number as the division line number Ld1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
an image reading device configured to execute a continuous reading process to scan a plurality of document sheets, while sequentially reading a plurality of line images from each of the document sheets and sequentially outputting data of the line images;
a sheet conveying device configured to execute: a primary conveyance in which to convey a sheet from a sheet storage portion to a resist position and temporarily stop the sheet at the resist position; and a secondary conveyance in which to convey the sheet from the resist position along a path that passes a transfer position;
a processor configured to, in parallel to the continuous reading process, divide data of a plurality of line images corresponding to a page image of each of the document sheets, into a plurality of pieces of band data each of which is composed of data of a certain number of line images;
an image processing device configured to generate a piece of secondary data for each of the plurality of pieces of band data by acquiring the plurality of pieces of band data from the processor and performing image processing to the plurality of pieces of band data, and generate an interrupt to the processor each time of generating a piece of secondary data; and
a transfer device configured to transfer a toner image formed based on the secondary data, to the sheet at the transfer position, wherein
the processor includes:
a division line number setting portion configured to set, for each of page images of the document sheets, a division line number representing a number of line images based on contents of one or more predetermined reference parameters related to load of the processor;
a band dividing portion configured to divide data of each of the page images into the plurality of pieces of band data each of which is composed of data of as many line images as the division line number;
a band number setting portion configured to set a specific band number in response to the division line number for each of the page images, the specific band number being smaller than a number of the plurality of pieces of band data divided from a page image;
a primary conveyance event outputting portion configured to output, in synchronization with a start of predetermined data processing on a $1^{st}$ piece of band data for each of the page images, a primary conveyance event that instructs the sheet conveying device to start the primary conveyance; and
a secondary conveyance event outputting portion configured to output, in synchronization with an end of the predetermined data processing on as many pieces of band data as the specific band number from the $1^{st}$ piece of band data for each of the page images, a secondary conveyance event that instructs the sheet conveying device to start the secondary conveyance.

2. The image forming apparatus according to claim 1, wherein
the one or more predetermined reference parameters include a partial data size that is a size of data of line images included in a partial area from a start point of each of the document sheets, among the data of the line images sequentially output from the continuous reading process, and
the band dividing portion sets, as the division line number, a predetermined first line number or a second line number depending on whether or not the partial data size exceeds a reference size, wherein the second line number is larger than the first line number.

3. The image forming apparatus according to claim 1, wherein
the one or more predetermined reference parameters include a use rate of the processor, and
the band dividing portion sets, as the division line number, a predetermined first line number or a second line number depending on whether or not the use rate of the processor exceeds a reference use rate, wherein the second line number is larger than the first line number.

4. The image forming apparatus according to claim 1, wherein the band number setting portion derives the specific band number based on the division line number and a length of each of the document sheets in a scanning direction of the document sheets.

\* \* \* \* \*